US012611764B2

(12) United States Patent
Verduin

(10) Patent No.: US 12,611,764 B2
(45) Date of Patent: Apr. 28, 2026

(54) TRIM GAUGE

(71) Applicant: Jacob Ethan Verduin, Byron Center, MI (US)

(72) Inventor: Jacob Ethan Verduin, Byron Center, MI (US)

( * ) Notice: Subject to any disclaimer, the term of this patent is extended or adjusted under 35 U.S.C. 154(b) by 342 days.

(21) Appl. No.: 18/443,831

(22) Filed: Feb. 16, 2024

(65) Prior Publication Data

US 2025/0262749 A1 Aug. 21, 2025

(51) Int. Cl.
*G01B 3/50* (2006.01)
*B25H 7/04* (2006.01)

(52) U.S. Cl.
CPC .................................... *B25H 7/04* (2013.01)

(58) Field of Classification Search
CPC ... G01B 3/14; G01B 3/30; G01B 3/46; G01B 3/50; G01B 5/20
USPC .......................................... 33/562, 613, 645
See application file for complete search history.

(56) References Cited

U.S. PATENT DOCUMENTS 1,656,819 A * 1/1928 Fetz ........................ B27B 27/02 144/253.1
1,809,547 A 6/1931 Briney
2,375,945 A * 5/1945 Redmer ................... G01B 3/50 33/501.45
2,473,639 A * 6/1949 Erickson ............... E04F 21/003 33/562
2,799,077 A * 7/1957 Mitchell .................. B27G 5/02 83/466.1
2,853,786 A * 9/1958 Ellstrom, Sr. ............ G01B 3/30 33/567
3,164,908 A * 1/1965 Palozie .................... G01N 3/56 116/208
3,829,977 A * 8/1974 Lambert .................. G01B 3/56 33/531
3,845,568 A 11/1974 Johnson et al.
(Continued)

FOREIGN PATENT DOCUMENTS

CN 207923023 U 9/2018
CN 106123721 B 5/2019
(Continued)

OTHER PUBLICATIONS

Gestamp, Specifications, Checking Fixtures and Holding Fixtures, published Dec. 22, 2021.

*Primary Examiner* — George B Bennett
(74) *Attorney, Agent, or Firm* — Oppenhuizen Law PLC; David L. Oppenhuizen

(57) ABSTRACT

A trim gauge for inspecting the dimension of a workpiece includes a body having a first body portion and a second body portion, the second body portion having a thickness smaller than the first body portion. The trim gauge also includes a first flange coupled to the second body portion and extending radially outwardly of the second body portion. A thickness of the first flange corresponds to a lower acceptable limit for the measured dimension of the workpiece. The trim gauge further includes a second flange coupled to the second body portion and extending radially outwardly from the second body portion. A thickness of the second flange is smaller than the first flange and corresponds to an upper acceptable limit for the measured dimension of the workpiece.

16 Claims, 3 Drawing Sheets

(56) References Cited

U.S. PATENT DOCUMENTS

| | | | | | |
|---|---|---|---|---|---|
| 4,989,336 | A * | 2/1991 | Waltrip, Jr. | E04F 21/003 33/526 |
| 5,042,161 | A * | 8/1991 | Hodge | A61F 2/06 D10/64 |
| 5,123,172 | A * | 6/1992 | Thrun | E04F 21/00 33/526 |
| 5,199,180 | A * | 4/1993 | Yablonsky | G01B 3/30 D10/64 |
| 5,471,757 | A * | 12/1995 | McDonald | G01B 3/30 D10/64 |
| 5,737,844 | A * | 4/1998 | Brumley | B25H 7/00 33/194 |
| 6,305,091 | B1 * | 10/2001 | Tegels | E04F 21/003 269/95 |
| 6,532,674 | B2 * | 3/2003 | Farese | E04F 21/003 33/194 |
| 6,739,064 | B1 | 5/2004 | Smith | |
| 6,993,852 | B2 * | 2/2006 | Russell | F16C 35/067 33/645 |
| 7,240,435 | B1 * | 7/2007 | Dowdakin | E04F 21/0015 33/194 |
| 7,329,076 | B2 * | 2/2008 | Hartney | F16B 39/028 411/60.1 |
| 8,220,176 | B2 * | 7/2012 | Loisel | F16B 35/04 33/542 |
| 9,476,821 | B2 * | 10/2016 | Igarashi | C25D 5/026 |
| 10,571,235 | B2 * | 2/2020 | Stewart | G01B 3/42 |
| 10,982,943 | B1 * | 4/2021 | Meyer | G01B 5/18 |
| 11,486,688 | B1 * | 11/2022 | Capo | G01C 9/32 |
| 12,259,237 | B2 * | 3/2025 | Cranford | G01B 5/08 |
| 2005/0022397 | A1 * | 2/2005 | Neblo | E04F 21/003 33/194 |
| 2019/0128655 | A1 | 5/2019 | Peters | |
| 2021/0123713 | A1 * | 4/2021 | Burton | G01B 3/50 |

FOREIGN PATENT DOCUMENTS

| | | | |
|---|---|---|---|
| KR | 20140136547 | A | 12/2014 |
| WO | 2020171664 | A2 | 8/2020 |

* cited by examiner

TRIM GAUGE

BACKGROUND

1. Field of the Invention

The present invention relates generally to a gauge. More particularly, the presentation invention pertains to a trim gauge used to inspect the trim length of a workpiece.

2. Description of the Prior Art

It is known in the field of manufacturing that a trim gauge is an instrument used to inspect dimensions of workpieces to determine whether the dimensions of the workpieces are within desired tolerance limits. However, known gauges used to verify the trim of workpieces tend to be rather large, unintuitive, and unwieldy to enable quick measurement.

SUMMARY

A trim gauge for inspecting dimensions of a workpiece is disclosed.

The trim gauge comprises a body having a first end and a second end, the body further having a first body portion located proximally to the first end, a second body portion, a first flange, and a second flange, the second body portion, the first flange, and the second flange each being located distally from the first end and proximate to the second end, the second body portion having a thickness smaller than the first body portion;

- the first flange having a larger thickness than the second body portion, wherein the thickness of the first flange corresponds to a lower acceptable limit for the measured dimension of the workpiece; and
- the second flange having a smaller thickness than the first flange, wherein the thickness of the second flange corresponds to an upper acceptable limit for the measured dimension of the workpiece.

Optionally, the cross section of the body is circular.

In an embodiment, the first flange is located at the second end of the body, and the second flange is positioned between the first flange and the second body portion.

In an embodiment, the first flange is located at the second end of the body, and the second flange is positioned between the first body portion and the second body portion.

In an embodiment, the second flange is located at the second end of the body, and the first flange is positioned between the first body portion and the second body portion.

Additionally, a method of measuring a trim dimension on a workpiece retained by an inspection fixture using a trim gauge is disclosed. The method comprises:

- providing the trim gauge having a body having a first end and a second end, the body further having a first body portion located proximally to the first end, a second body portion, a first flange, and a second flange, the second body portion, the first flange, and the second flange each being located distally from the first end and proximate to the second end, the second body portion having a thickness smaller than the first body portion;
  - the first flange having a larger thickness than the second body portion, wherein the thickness of the first flange corresponds to a lower acceptable limit for the measured trim dimension of the workpiece; and
  - the second flange having a smaller thickness than the first flange, wherein the thickness of the second flange corresponds to an upper acceptable limit for the measured trim dimension of the workpiece;
- providing the inspection fixture, the inspection fixture having a fixture for retaining the workpiece, and an inspection gauge surface located adjacent to the fixture;
- providing the workpiece, the workpiece having a form which extends from the fixture toward the inspection gauge surface of the inspection fixture, the form terminating at a trim edge;
- placing the workpiece against the fixture of the inspection fixture such that the form extends in a direction with the trim edge being arranged proximate to the inspection gauge surface of the inspection fixture;
- placing the trim gauge against the inspection gauge surface of the inspection fixture such that the first body portion is arranged adjacent the inspection gauge surface of the inspection fixture, and the second body portion extends from the inspection gauge surface toward the fixture such that the first flange and the second flange are positioned proximate to the fixture;
- moving the trim gauge along the inspection gauge surface in a lateral direction substantially parallel to an elongation of the body, such that the second flange is translated across the trim edge of the form, whereby a length of the form is determined to be out of tolerance and too long when the trim edge contacts the second flange;
- moving the trim gauge along the inspection gauge surface in a lateral direction substantially parallel to an elongation of the body, such that the first flange is translated across the trim edge of the form, whereby a length of the form is determined to be out of tolerance and too short when the trim edge does not contact the second flange; and
- determining that the length of the form of the workpiece is within tolerance when both the second flange does not contact the trim edge of the form and the first flange does contact the trim edge of the form.

For a more complete understanding of the disclosure, reference is made to the following detailed description and accompanying drawings. In the drawings, like reference characters refer to like parts throughout the views in which:

DETAILED DESCRIPTION

Figure 1:
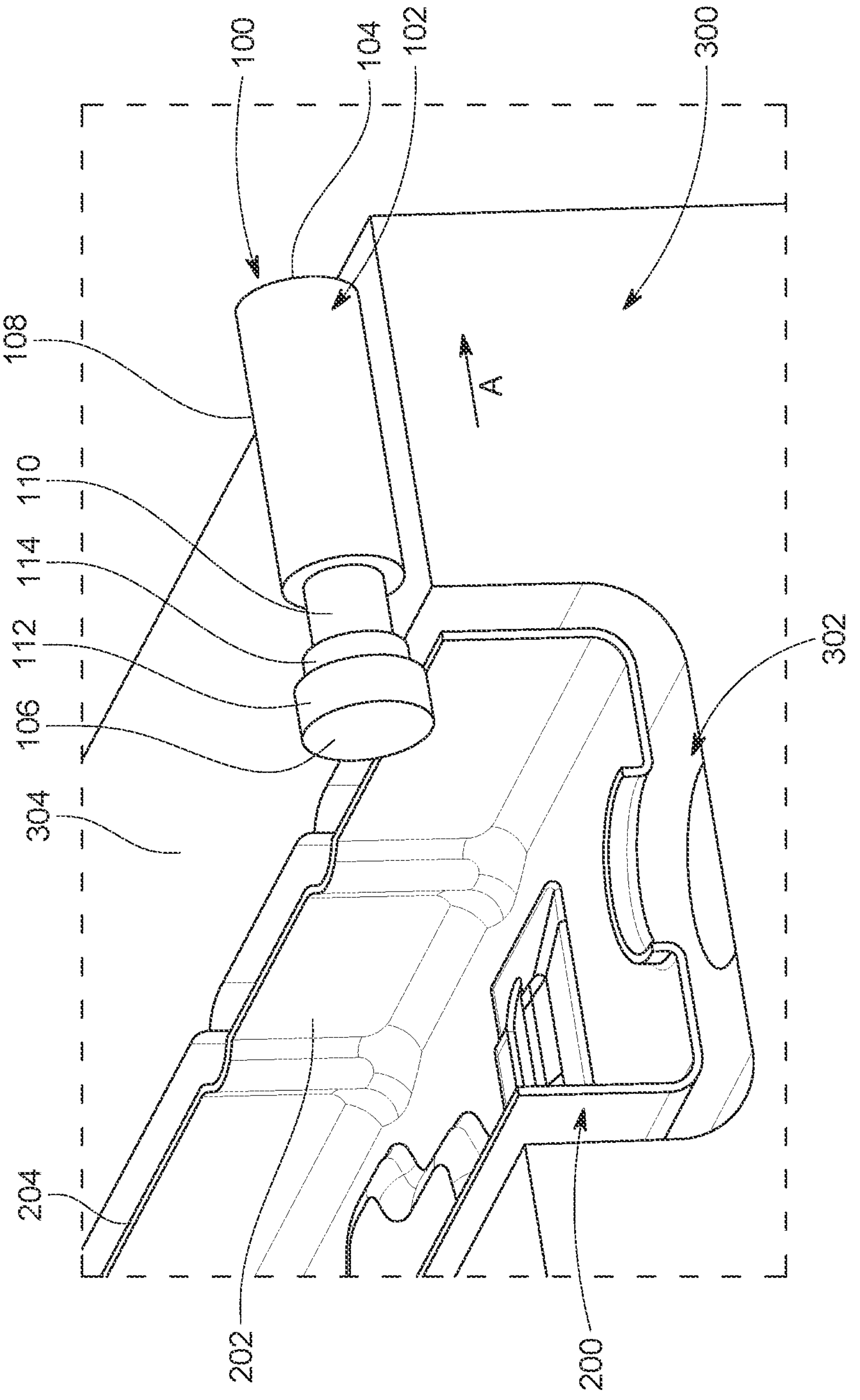
FIG. 1 illustrates a trim gauge positioned on a fixture to inspect a dimension of a trim edge on a form of a workpiece retained by the fixture, in accordance with an embodiment of the disclosure.

Referring to FIG. 1, a trim gauge 100 (hereinafter referred to as gauge) for inspecting the trim dimensions of a workpiece 200, arranged on an inspection fixture 300 is shown. As shown, the inspection fixture 300 includes a fixture 302 for retaining the workpiece 200 for inspection, and an inspection gauge surface 304 adjacent to the fixture 302 which supports the gauge 100 during inspection of the workpiece 200.

The fixture 302 shown in FIG. 1 defines a cavity in which the workpiece 200 is nested. As shown, a form 202 of the workpiece 200 extends generally upwardly and terminates at a trim edge 204. The trim gauge 100 is used to measure whether the length of the form 202 (as measured by the position of the trim edge 204) is within tolerance. The trim gauge 100 is placed against the inspection gauge surface 304 during the inspection process. However, it is understood by those having ordinary skill in the art that the orientation of the gauge 100 and the inspection gauge surface 304 may vary for each application, and are dependent on the geometry of the workpiece 200 and the trim edge 204 to be measured. For example, it is to be understood that the fixture 302 does not need to be a cavity, and the fixture 302 may instead be relatively flat in nature and include detents or other physical features to complement and retain the workpiece 200 for inspection. Likewise, the form 202 of the workpiece may be substantially co-planar with the body of the workpiece 200, or the form 202 may be at any other angle or orientation. The geometry of the workpiece 200 and the trim edge 204 to be measured will dictate the orientation of the inspection gauge surface 304 and the gauge 100. But regardless of the orientation, it is to be understood that the inspection gauge surface 304 is typically perpendicular to the plane of the form 202 to allow the gauge 100 to accurately measure the location of the trim edge 204.

Figure 2:
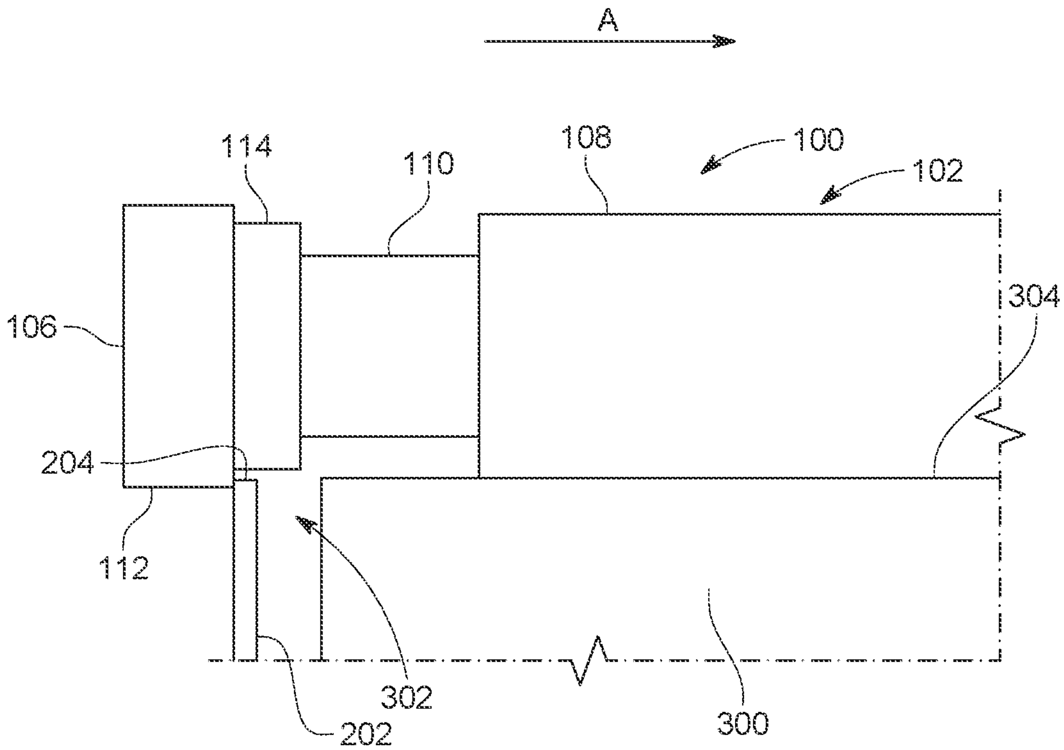
FIG. 2 illustrates the trim gauge depicting a first flange arranged in contact with the form, while the second flange is arranged at a distance from the trim edge of the form illustrating that a length of the form is within the upper limit and the lower limit, in accordance with an embodiment of the disclosure.

Turning back to the gauge 100 as shown in FIGS. 1 and 2, the gauge 100 preferably includes a substantially cylindrical body 102 having a first end 104, a second end 106, a first body portion 108 extending in an axial direction of the body 102 from the first end 104 towards the second end 106, and a second body portion 110 extending from the first body portion 108 to the second end 106. As shown, the second body portion 110 has a diameter (or thickness or girth) smaller than a diameter (or thickness or girth) of the first body portion 108. During inspection, the first body portion 108 is arranged on an inspection gauge surface 304 of the inspection fixture 300, while the second body portion 110 extends, at least partially, toward the trim edge 204 of the workpiece 200 retained by the fixture 302.

The body 102 of the gauge 100 has been described hereinabove as preferably being substantially cylindrical and having a circular or oval cross-section along the axial length thereof. However, the body 102 can alternatively have a cross-sectional shape which is square, rectangular, triangular, pentagonal, or any other suitable type of shape.

Furthermore, the gauge 100 includes a first flange 112 extending radially outwardly from the second body portion 110 and arranged circularly around a central axis of the body 102. In the illustrated embodiment, the first flange 112 is located at an end, i.e., a second end 106 of the body 102. Additionally, the gauge 100 includes a second flange 114 extending radially outwardly from the second body portion 110 and arranged circularly around the central axis of the body 102. In the embodiment, the second flange 114 is arranged contacting the first flange 112, and being positioned between the first body portion 108 and the first flange 112.

As shown, a diameter (or thickness or girth) of the second flange 114 is smaller than a diameter (or thickness or girth) of the first flange 112. It may be appreciated that the diameter (or thickness or girth) of the first flange 112 is selected so as to correspond to a first allowable limit (i.e., lower limit) for the dimension (e.g., height, length, depth, etc.) of a feature of the workpiece 200, namely, the form 202, while the diameter (or thickness or girth) of the second flange 114 is selected so as to correspond to a second allowable limit (i.e., upper limit) for the dimension of the form 202 of the workpiece 200 being inspected. Accordingly, the trim dimension of the workpiece 200 is considered to be within the acceptable limit when the form 202 of the workpiece 200 does not contact the second flange 114, and while the form 202 of the workpiece 200 does contact the first flange 112 as the gauge 100 is moved in a lateral direction 'A' of the inspection fixture 300 during inspection, as shown in FIGS. 1 and 2. It is noted that the lateral direction 'A' is substantially parallel to the elongation of the body 102.

Figure 3:
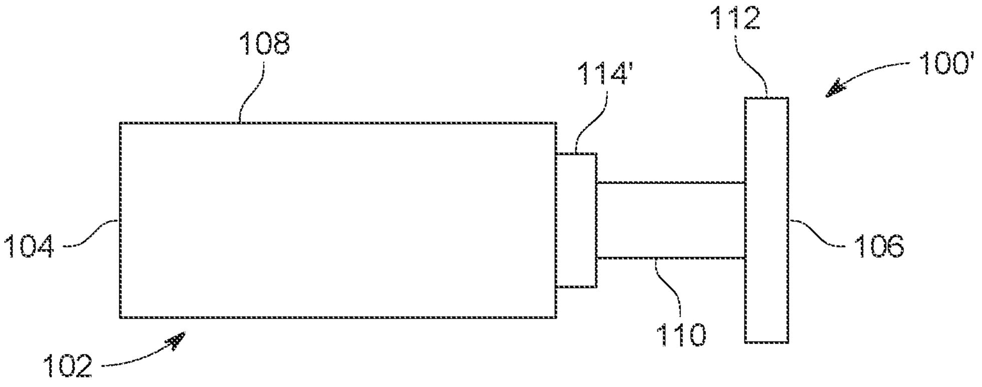
FIG. 3 illustrates a trim gauge, in accordance with an alternative embodiment of the disclosure.

Referring to FIG. 3, a trim gauge 100' is shown, according to an alternative embodiment of the disclosure. The trim gauge 100' is similar to the trim gauge 100 except that a second flange 114' of the trim gauge 100' is arranged at a distance from the first flange 112, and contacts the first body portion 108. Accordingly, the second flange 114' is arranged at an interface/junction of (or between) the first body portion 108 and the second body portion 110.

Figure 4:
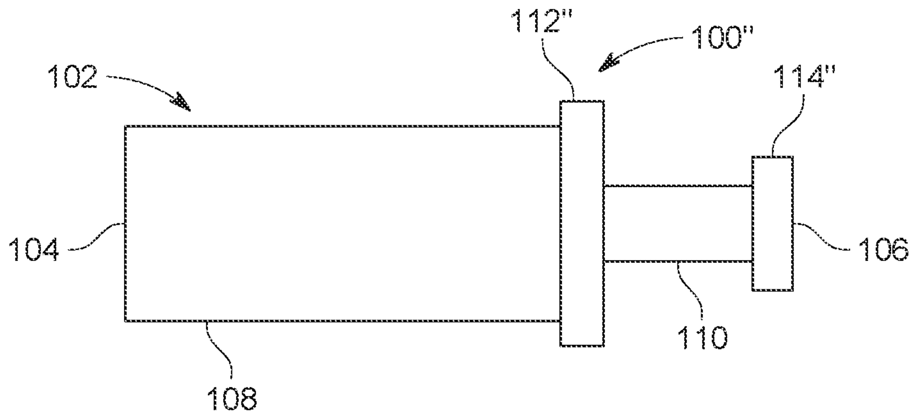
FIG. 4 illustrates a trim gauge, in accordance with yet another embodiment of the disclosure.

Referring to FIG. 4, a trim gauge 100" according to an embodiment is shown. The trim gauge 100" is similar to the trim gauge 100' shown in FIG. 3 except that the trim gauge 100" includes a first flange 112" positioned at an interface of (or between) the first body portion 108 and the second body portion 110, while a second flange 114" is arranged at the second end 106 of the body 102 of the trim gauge 100".

A method for inspecting the trim dimensions of the form 202 of the workpiece 200 using the gauge 100 is described below. To inspect the trim dimensions, a user positions or seats the workpiece 200 onto the fixture 302 of the inspection fixture 300 such that the form 202 extends in a first direction with a trim edge 204 being arranged proximate to the inspection gauge surface 304 of the inspection fixture 300, as shown in FIG. 1. The user then positions the gauge 100 adjacent the inspection fixture 300 such that the first body portion 108 is arranged against the inspection gauge surface 304 of the inspection fixture 300, and the second body portion 110 extends away from the inspection gauge surface 304, toward the form 202, and is spaced from the fixture 302 such that the first flange 112 and the second flange 114 are proximate to the fixture 302. Next, the user moves the gauge 100 along the inspection gauge surface 304 in a lateral direction, such as in the lateral direction 'A' as shown in FIGS. 1 and 2. As the user moves the gauge in the lateral direction 'A', the trim edge 204 of the workpiece 200 may contact the second flange 114 indicating that a length or dimension of the form 202 is above the upper limit, or stated otherwise, that the form 202 is too long. However, if the trim edge 204 remains spaced from the second flange 114 and the second flange 114 passes the trim edge 204 without contacting the form 202, then the length of the form 202 is below the upper limit, as shown in FIG. 2.

As the gauge 100 is then further moved in the lateral direction 'A', the trim edge 204 of the form 202 may contact the first flange 112 indicating that the length or the dimension of the form 202 is greater than the lower limit, as shown in FIG. 2. However, the length of the form 202 is less than the lower limit of the trim edge 204 does not contact the first flange 112 when the gauge is moved in the lateral direction 'A'. In this manner, the trim gauge 100 facilitates the inspection of the trim dimensions of a workpiece and determines whether the trim dimensions are within the acceptable limits i.e., between the upper limit and the lower limit.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

What is claimed is:

1. A trim gauge for inspecting the dimension of a workpiece, the trim gauge comprising:

a body having a first end and a second end, the body further having a first body portion located proximally to the first end, a second body portion, a first flange, and a second flange, the second body portion, the first flange, and the second flange each being located distally from the first end and proximate to the second end, the second body portion having a thickness smaller than the first body portion;

the first flange having a larger thickness than the second body portion, wherein the thickness of the first flange corresponds to a lower acceptable limit for the measured dimension of the workpiece; and the second flange having a smaller thickness than the first flange, wherein the thickness of the second flange corresponds to an upper acceptable limit for the measured dimension of the workpiece.

2. The trim gauge of claim 1 wherein the cross section of the body is circular.

3. The trim gauge of claim 1 wherein the first flange is located at the second end of the body, and the second flange is positioned between the first flange and the second body portion.

4. The trim gauge of claim 3 wherein the cross section of the body is circular.

5. The trim gauge of claim 1 wherein the first flange is located at the second end of the body, and the second flange is positioned between the first body portion and the second body portion.

6. The trim gauge of claim 5 wherein the cross section of the body is circular.

7. The trim gauge of claim 1 wherein the second flange is located at the second end of the body, and the first flange is positioned between the first body portion and the second body portion.

8. The trim gauge of claim 7 wherein the cross section of the body is circular.

9. A method of measuring a trim dimension on a workpiece seated in an inspection fixture using a trim gauge, the method comprising:

providing the trim gauge having a body having a first end and a second end, the body further having a first body portion located proximally to the first end, a second body portion, a first flange, and a second flange, the second body portion, the first flange, and the second flange each being located distally from the first end and proximate to the second end, the second body portion having a thickness smaller than the first body portion;

the first flange having a larger thickness than the second body portion, wherein the thickness of the first flange corresponds to a lower acceptable limit for the measured trim dimension of the workpiece; and the second flange having a smaller thickness than the first flange, wherein the thickness of the second flange corresponds to an upper acceptable limit for the measured trim dimension of the workpiece;

providing the inspection fixture, the inspection fixture having a fixture for retaining the workpiece, and an inspection gauge surface located adjacent to the fixture;

providing the workpiece, the workpiece having a form which extends from the fixture toward the inspection gauge surface of the inspection fixture, the form terminating at a trim edge;

placing the workpiece against the fixture of the inspection fixture such that the form extends in a direction with the trim edge being arranged proximate to the inspection gauge surface of the inspection fixture;

placing the trim gauge against the inspection gauge surface of the inspection fixture such that the first body portion is arranged adjacent the inspection gauge surface of the inspection fixture, and the second body portion extends from the inspection gauge surface toward the fixture such that the first flange and the second flange are positioned proximate to the fixture;

moving the trim gauge along the inspection gauge surface in a lateral direction substantially parallel to an elongation of the body, such that the second flange is translated across the trim edge of the form, whereby a length of the form is determined to be out of tolerance and too long when the trim edge contacts the second flange;

moving the trim gauge along the inspection gauge surface in a lateral direction substantially parallel to an elongation of the body, such that the first flange is translated across the trim edge of the form, whereby a length of the form is determined to be out of tolerance and too short when the trim edge does not contact the second flange; and determining that the length of the form of the workpiece is within tolerance when both the second flange does not contact the trim edge of the form and the first flange does contact the trim edge of the form.

10. The method of claim 9 wherein the cross section of the body is circular.

11. The method of claim 9 wherein the first flange is located at the second end of the body, and the second flange is positioned between the first flange and the second body portion.

12. The method of claim 11 wherein the cross section of the body is circular.

13. The method of claim 9 wherein the first flange is located at the second end of the body, and the second flange is positioned between the first body portion and the second body portion.

14. The method of claim 13 wherein the cross section of the body is circular.

15. The method of claim 9 wherein the second flange is located at the second end of the body, and the first flange is positioned between the first body portion and the second body portion.

16. The method of claim 15 wherein the cross section of the body is circular.

* * * * *